350-1?? SEARCH ROOM

July 19, 1960 D. H. KELLY 2,945,413

OPTICAL BEAM LINKING SYSTEMS

Filed Aug. 10, 1954 5 Sheets-Sheet 1

Inventor
Donald H. Kelly
by Roberts, Cushman & Grover
attys.

Inventor
Donald H. Kelly
by Roberts, Cushman & Grover
att'ys.

OPTICAL BEAM LINKING SYSTEMS

Filed Aug. 10, 1954 5 Sheets-Sheet 3

Inventor
Donald H. Kelly
By Roberts, Cushman & Grover,
Att'ys

Inventor
Donald H. Kelly
by Roberts, Cushman & Grover
Att'ys.

Inventor
Donald H. Kelly
by Roberts, Cushman & Grover
att'ys.

United States Patent Office 2,945,413

Patented July 19, 1960

2,945,413

OPTICAL BEAM LINKING SYSTEMS

Donald H. Kelly, Los Angeles, Calif., assignor to Technicolor Corporation, Hollywood, Calif., a corporation of Maine Filed Aug. 10, 1954, Ser. No. 448,874

4 Claims. (Cl. 88—1)

The present invention relates to optical systems used for the interrelating of light beams by concomitant transmission and reflection at linking surfaces. If such systems are used with convergent or divergent beams they suffer from uneven distributions, across their utilized fields, of optical characteristics related to wave length and amplitude. These irregularities are mainly due to unavoidable differences of the angles of incidence of the rays of image carrying beams impinging on a linking surface, especially if that surface is oblique to the axis of the beam.

This problem is particularly serious in the case of light beam resolution or combination for purposes of color photography or color television, by means of optical interference coatings at the camera or sending end, or at the projector or receiving end. Such arrangements require total uniformity or at least controlled variation within each image, and also coordination of the color characteristics of the several color separation images; in addition, the sensitivity and other characteristics of components such as emulsions or analyzing and light emitting screens and the human eye have to be taken into consideration. In most instances, systems of this type have to be used with fairly wide fields and steep dividing surface inclinations, which aggravates the problem. A solution is presented in my copending application Serial No. 237,912, dated July 21, 1951, now abandoned, of which this is in part a continuation.

It is one of the principal objects of the present invention to provide improved light linking systems incorporating optical interference coatings which permit compensation and regulation within predictable limits of the above mentioned uneven field distribution of optical characteristics, according to the requirements presented by the proposed use.

Other objects are to provide beam linking systems which incorporate optical interference coatings, and are compensated for distribution irregularities of saturation, brightness and especially hue (the relationship between intensity and wave length in physical rather than psychophysiological terms) across the practically utilized system field; to provide such systems which are particularly advantageous for such purposes as color separation cameras, optical printers, or additive projectors which deal with separate color aspect images; to provide such systems which compensate for hue variation across the field but do not introduce brightness variation which might be objectionable in apparatus which employ such a coating usually in a position that would present such brightness variation across the field of vision rather than in the up and down direction, that is where the axes of the component beams are in a horizontal plane; to provide an optical system wherein the same beam linking surface can be used with lens systems of different focal lengths without change of the wave length distribution over the field; to provide such a system which is applicable to two aperture systems such as used in cameras using bipacks or other superimposed emulsions in one of the two apertures, as well as in three aperture devices with three instead of two component beams; to provide such systems with optical interference coatings either applied to flat plates or inclosed within glass bodies such as prisms, for purposes including color television and color photography, or wherever individual uniformity as well as balance and mutual control of color aspect images and records is essential; to provide such a system which so far as uniformity of field is concerned is at least as satisfactory as previously used systems with semi-transparent metallic such as silver reflectors whereas it offers all the advantages as to optimum light energy utilization provided by optical interference coatings; to provide such a system which permits control, sufficiently accurate for practical purposes, of the essential coating dimensions; to provide such a system which is for most purposes independent of the stop opening of the beam defining optical imaging system whether reflective or refractive; to provide such a system which does not affect to any objectionable degree the color rendition of dividing or combining arrangements; to provide such a system which is especially well suited for three aperture devices with three component beams, permitting in such systems adaptation of the field uniformity with regard to the principal wave length handled by the respective beams; to provide such a system which furnishes constant cutoff wave length of a bright hue band; and generally to improve color selective beam linking interference coatings with a view to optimum performance as well as possibility of manufacture according to predetermined specifications.

According to one of the principal aspects of the invention, a device for linking light beams of rays with incidence oblique to, and varying across a field, comprises a transparent body such as a flat plate or a prism which carries on a free or enclosed surface a wedge shaped coating of the fractional wave length optical interference type, which coating selectively reflects light predominantly of a wave length determined by ray incidence, and thickness as well as material of the layers of which the coating is composed, the direction and steepness of the wedge as defined by continuous variation of coating thickness being such as to allocate the reflectance at any one point of the coating to a respective predetermined spectral region, by relating at that point the selective effect of oblique incidence into the coating with the selective effect of the thickness of the coating whereby the compensated reflectance provides controlled distribution across the field of radiant energy (color) characteristics, such as wave length (hue), intensity (brightness), and admixture of white (saturation). As applied to color photography or television and analogous fields involving visual perception, the wave length composition or hue is so far as possible kept uniform over the field, or distributed over the field in predetermined manner. This wave length or wave length combination can be predetermined for a selected ray such as an axial ray and, according to the invention, the wedge can be so constructed that the axial ray as well as the chief rays as defined by the stopped down exit pupil of an imaging device are reflected essentially in the same manner. Further according to the invention, the wedge can be so formed that marginal rays as admitted by a wide open aperture are reflected within spectral ranges which are so distributed that the reflectances of the marginal beams as integrated over the field produce that hue which is characteristic of the much narrower and practically identical reflectance regions of the chief rays.

In a further aspect, the reflectance of the chief rays is kept essentially within a color aspect range of the spectrum, and in still another aspect the coating wedge is shaped in such a manner that the reflectance bands of rays which converge from the exit pupil on any one point of the image plane are substantially evenly distributed through the spectral range in question; in a preferred embodiment, the total effect of the chief and converging rays is essentially the same with regard to their physical and psychophysiological phases.

In an additional aspect, the invention contemplates the compensation of variations of color characteristics such as intensity, bandwidth or peak wavelength in beams of non-parallel light rays passing through a beam linking device which includes a selectively reflecting interference coating at which one or more characteristics are subject to variation with the varying angle of incidence of the rays, this compensation being accomplished by introducing a variation in the thickness of the coating in such sense and by such amount as to counteract non-uniformities in the characteristic or characteristics across a beam. This compensation is applied to each of the layers of which the coating consists, and the same linear wedge gradient can be applied to all layers of the coating regardless of refractive index differences between alternate layers. In accordance with the invention, this gradient can have an intermediate value between the two gradients required for individual compensation of the layers having the highest and lowest refractive indexes within the coating. In particular, the thickness of each of the layers is at a given point approximately inversely proportional to the cosine of the angle of refraction of a selected light ray within said layer at that point. In this manner, the thickness configuration of the coating counteracts non-uniformity in one color characteristic by an opposing non-uniformity in another characteristic.

For example variation of the peak wavelength is compensated by means of the thickness variation, and variation of intensity is minimized by high reflectance of peak wavelength of the coating. Also, the thickness configuration of the coating counteracts non-uniformity in one characteristic with respect to a beam by corresponding sensitivity limitations of light-sensitive medium in the beam, such as a photographic emulsion. Variations in one or more of the characteristics of two or more of the beams can be simultaneously compensated by means of thickness variation of the coating.

According to an additional important aspect, the invention permits the use of a wedge shaped beam linking interference coating, with a series of beam defining systems of varying focal length, by so mounting the coating and by so constructing various refractive or reflective beam defining or image forming systems that the coating and any one system of the series can be combined by retaining the exit pupils essentially in the same position.

Other objects, aspects and features will appear, in addition to those contained in the above statement of the nature and substance including some of the objects of the invention, from the herein presented outline of its basic principles and from the following description of several typical practical embodiments illustrating its novel characteristics. The outline and description refer to drawings in which.

Figure 1:
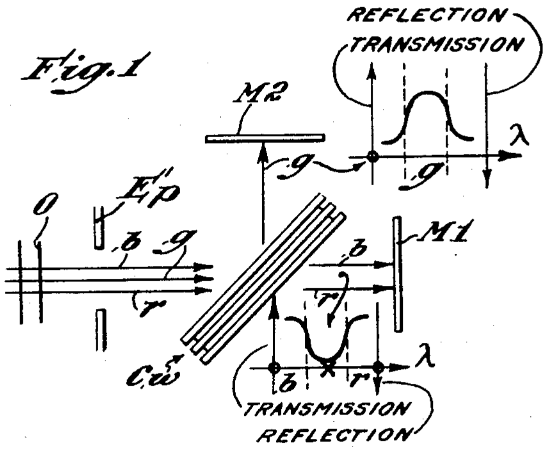
Fig. 1 is a diagram of a beam linking system of the light dividing type, to which the present invention can be applied, indicating spectral characteristics of the component beams.
Figure 2:
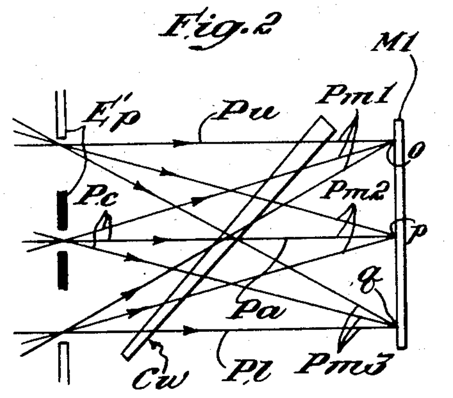
Fig. 2 is a diagram tracing certain rays of a system according to Fig. 1.
Figure 3:
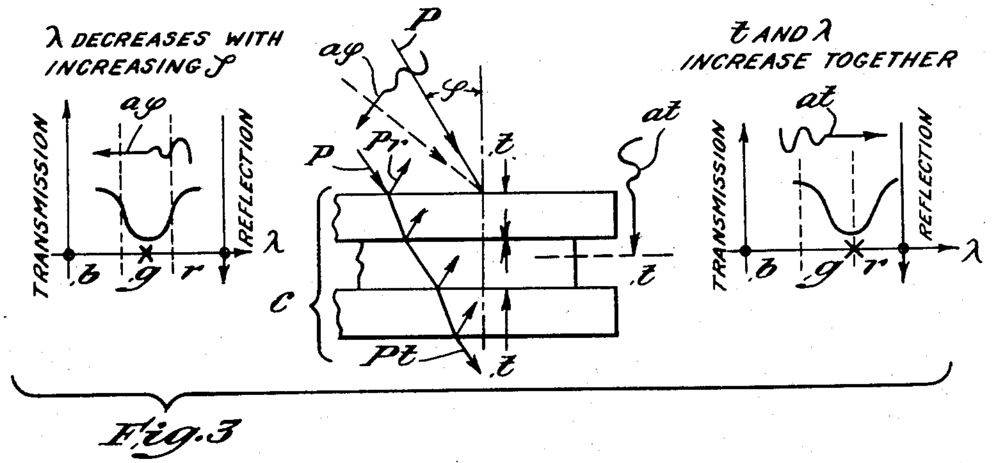
Fig. 3 is a diagram illustrating the relation of the wavelength of light reflected by optical interference coatings to the angle of incidence of the light and to the thickness of layers of the coating.
Figure 12:
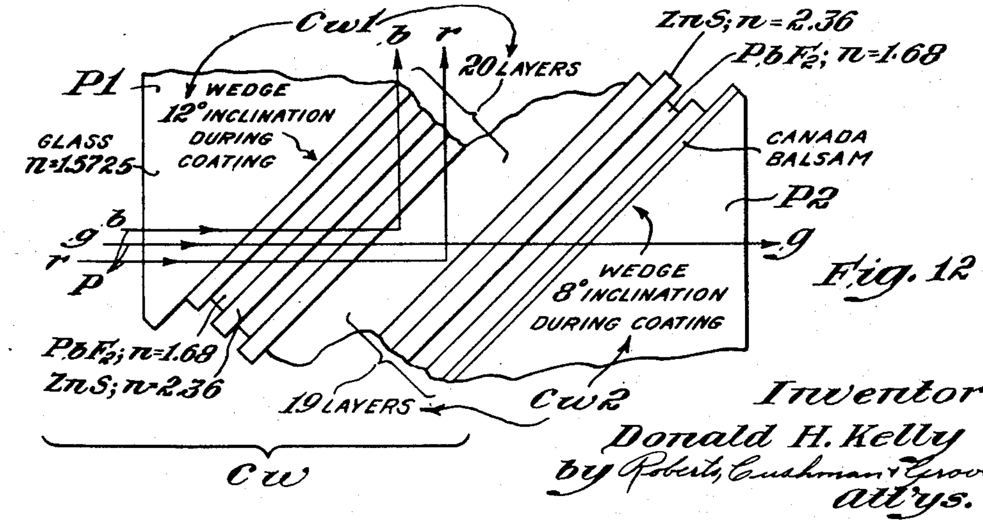
Figure 4:
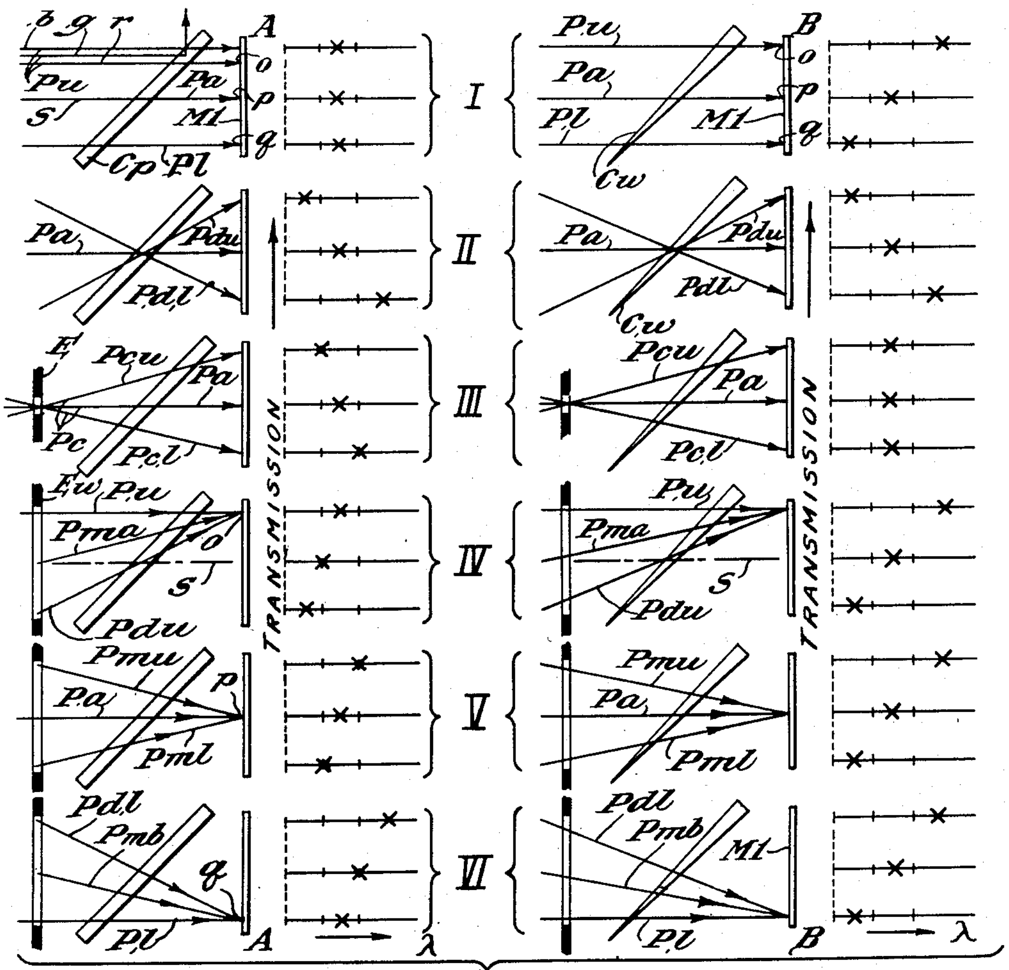
Figure 5:
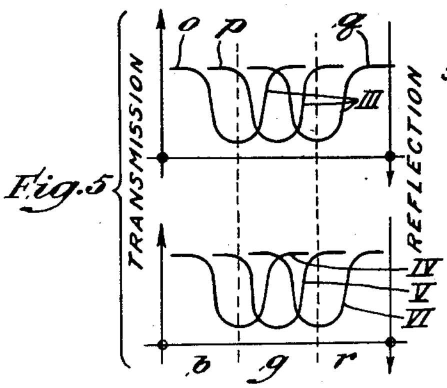
Figure 6:
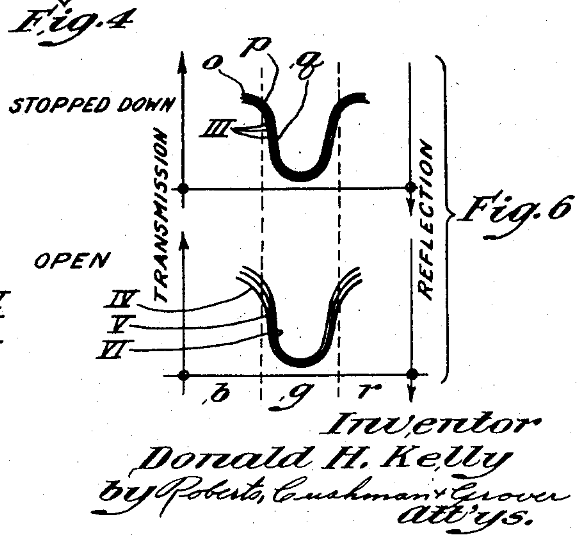
Figure 7:
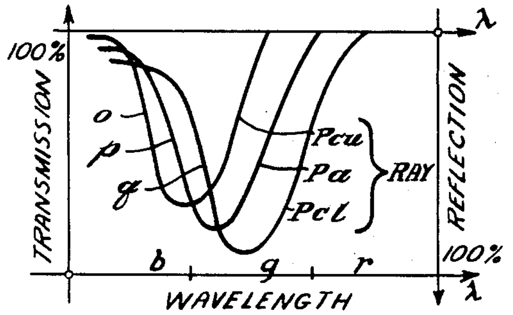
Figure 8:
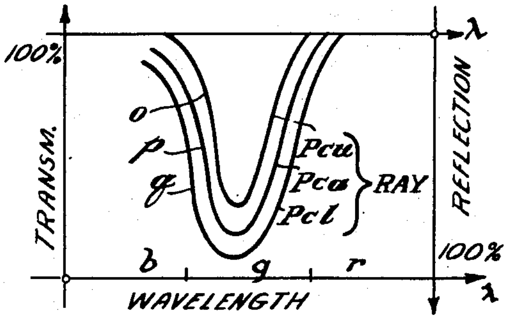
Figure 9:
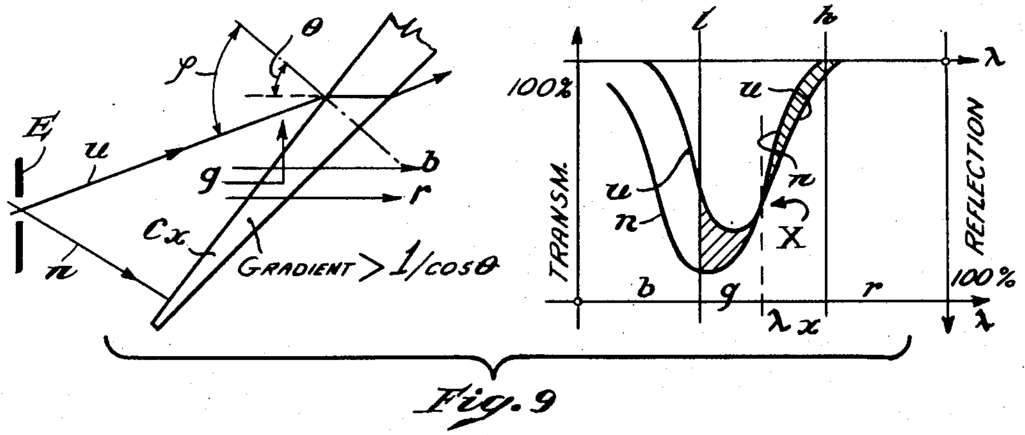
Figure 10:
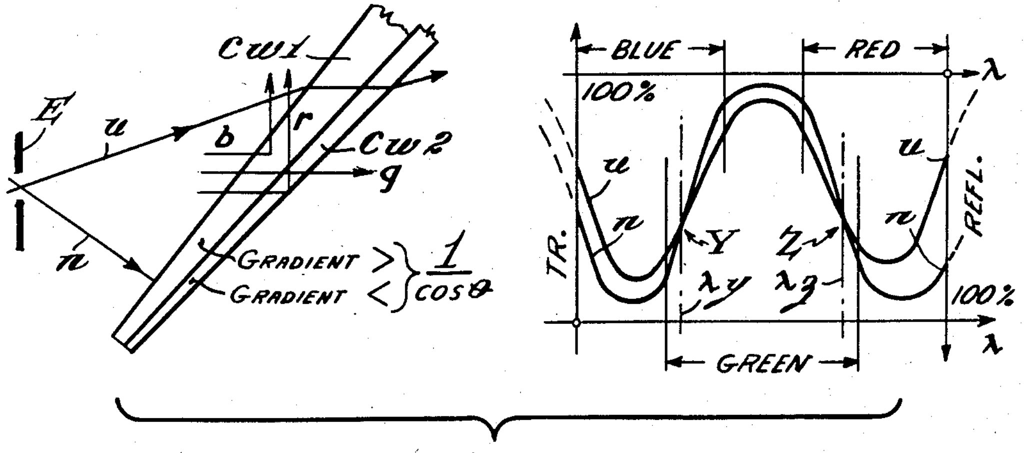
Figure 11:
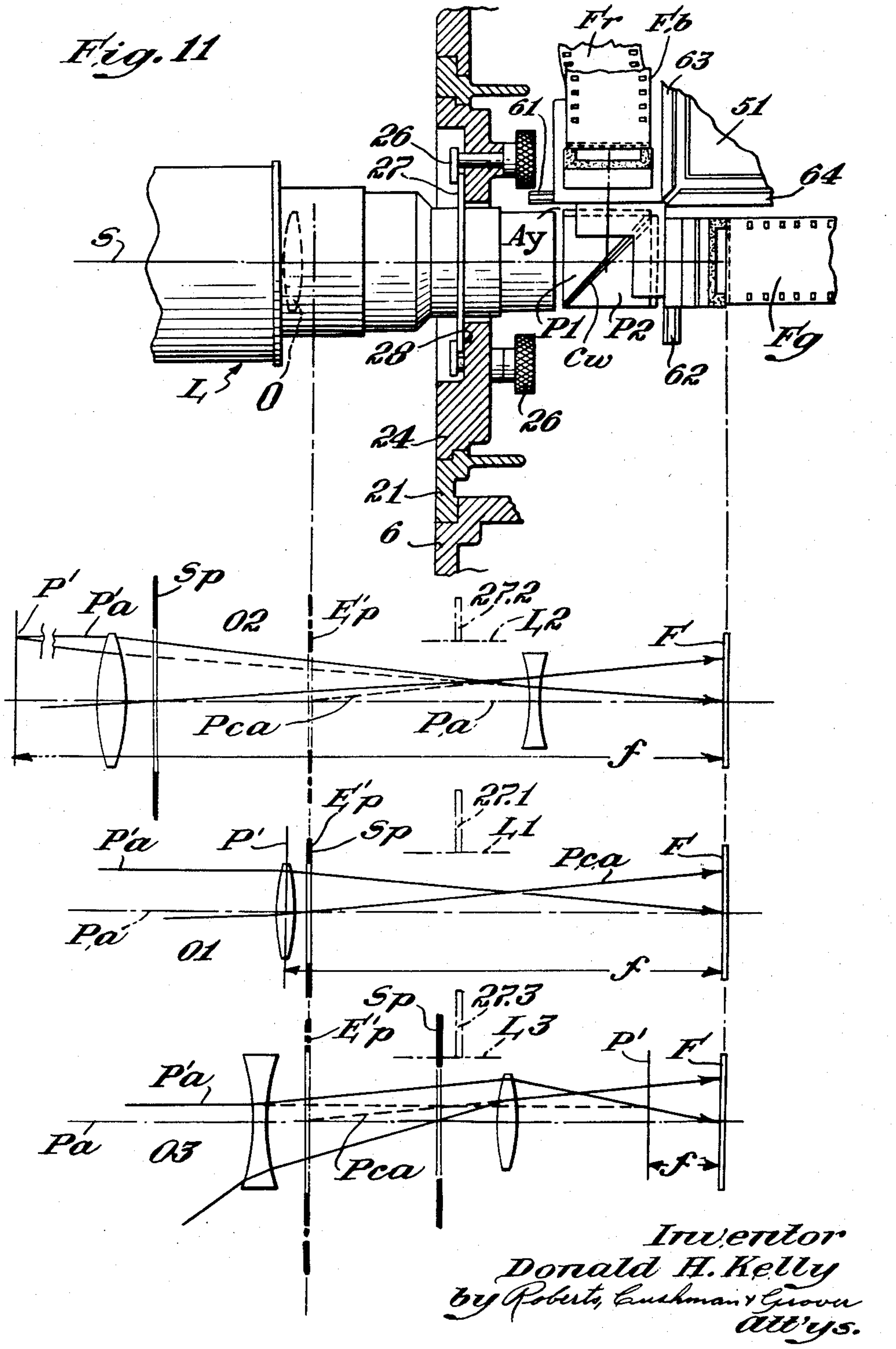
Figures 13, 14, 15, 16, 17:
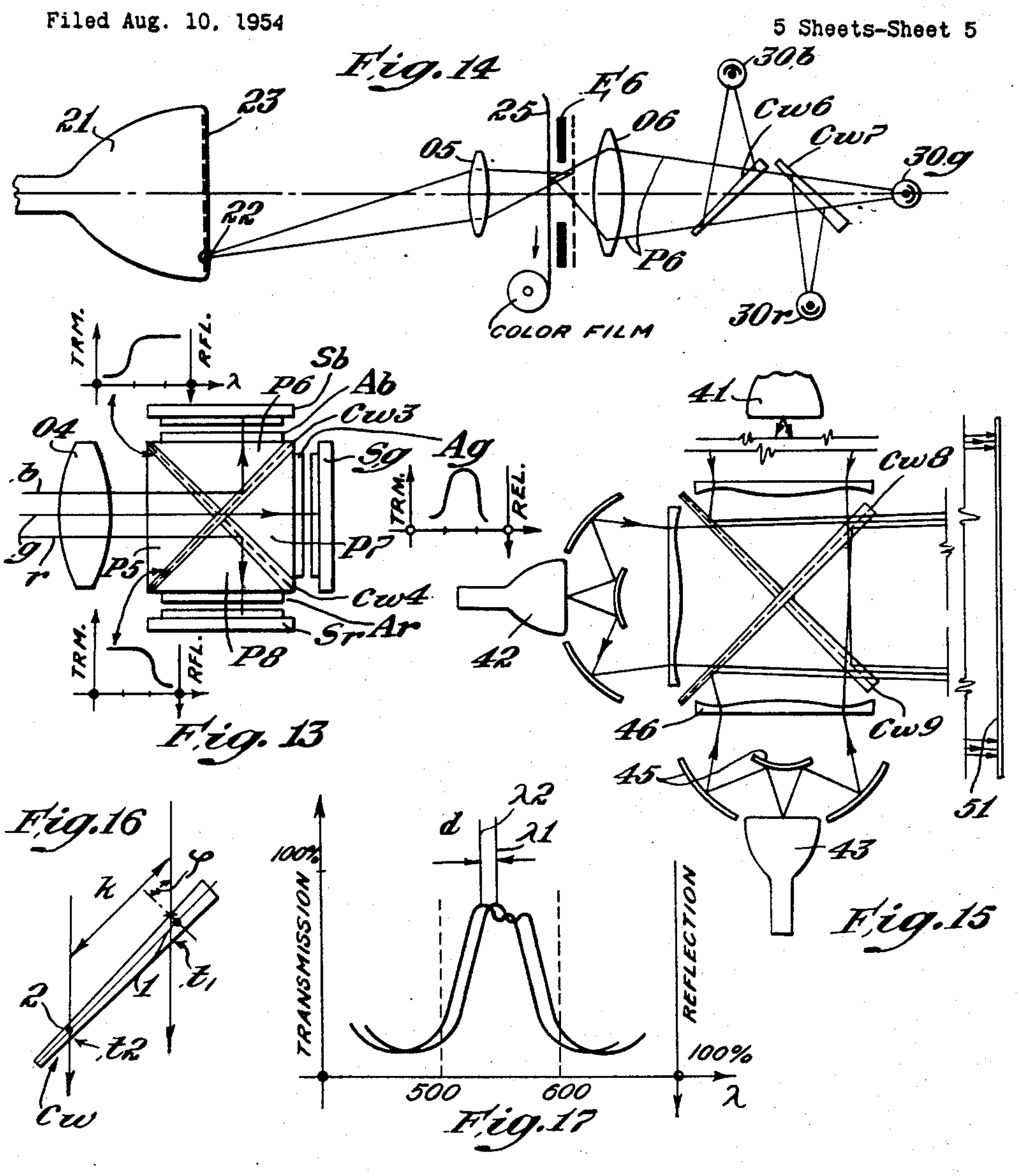
Figure 18:
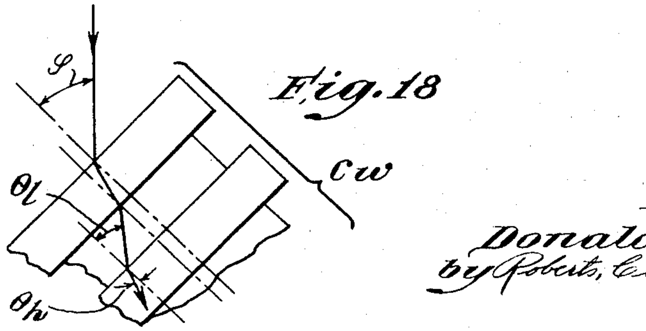

Figs. 4, 5 and 6 are diagrams based on Figs. 1, 2 and 3, illustrating the principles upon which the construction of specific embodiments of the present invention is based, certain details shown in Figs. 1 and 2 being omitted in Fig. 4 for the sake of simplicity;

Figs. 7 and 8 are diagrams illustrating the effect of devices according to Figs. 1, 2 and 3 similar to the showing of Figs. 5 and 6, but in more detailed manner;

Fig. 9 is a diagram analogous to those of Fig. 6, illustrating the effect of a coating having a wedge gradient according to the invention; in a device according to Fig. 1;

Fig. 10 is a diagram analogous to Fig. 9, illustrating the operation of a device according to Fig. 4 and incorporating coatings of the type illustrated in Fig. 12;

Fig. 11 is a cross section of the optical component of a color separation camera, combined with diagrams illustrating the correlation of a series of lens systems with a light dividing prism;

Fig. 12 is a diagrammatic sectional view of a light dividing prism according to Figs. 7 and 11, indicating in detail the structure of optical interference coatings shaped according to the invention;

Fig. 13 is a diagrammatic view of a three aperture system incorporating the invention;

Fig. 14 is a diagrammatic view of color television sending equipment incorporating the invention;

Fig. 15 is a diagrammatic view of color television receiving apparatus incorporating the invention; and Figs. 16, 17 and 18 are diagrams illustrating a technique of dimensioning interference layer wedges such as shown in Figs. 4 to 15.

In order to facilitate the perusal of the following description, the more important and significant concepts occurring therein and some of the terms associated therewith will first be shortly discussed as follows.

The term "record" is herein used for tangible reproductions or representations of pictures or symbols in any medium such as metallic silver, dye, ink, or defined by molecular or atomic modification such as latent silver halide records, vectograms, fluorescent layers including electron beam controlled emitters, and capacity patterns; the term "image" on the other hand is used for the "optical counterpart of any object produced by any optical system" (Webster). In this context it will be understood that the concept "imaging" is not restricted to imagery in a single direction, but includes the imaging of one pattern upon another in either direction, by an "image carrying beam." "Surface" is used essentially in its geometrical connotation, that is a plane or curved two dimensional field. An "interface" is a surface that separates two media of different indexes of refraction. "Picture surface" means a surface wherein either a record or an image, in the above sense, appears, can be detected, or is otherwise effective; this includes projection screens, photographic film records, picture screens of electronic scanning devices such as television sending or receiving tubes, and actual object fields. A "linking surface" associates several beams either by way of combining a plurality of image carrying beams into one beam, or by splitting a beam into a plurality of beams.

The term "spectrum" as herein used involves not only continuous portions, bands or lines of the visible spectrum, such as the blue, green and red ranges employed in color photography or color television, but also invisible ranges in so far as they can be utilized in systems of the general type herein dealt with such as the infrared and ultra violet ranges; this spectrum is therefore referred to as "optical spectrum." "Physical characteristics" are properties associated with radiant energy, such as involving the physical values of "wave length" including the concepts "band width" and "peak wavelength" of a transmission or reflection band, "intensity" or "amplitude," and "side bands" of radiant energy reflected or transmitted at other wavelengths than the main reflection or transmission. Their psychophysiological counterparts are the "color characteristics" involving "hue," "brightness" (brilliance) and "saturation," respectively. It should be kept in mind in this context that of purposes of visual perception, the attributes of the psychophysiological concept "color" will be correctly maintained in a chain of transmission from object field to cortex if proper equivalents in terms of physical values are maintained throughout, or deviations in any one link are appropriately corrected; indeed, the present invention involves such correction. With this reservation in mind the following discussions and descriptions follow to some extent the still prevailing custom of using psychophysiological terms (such as brightness or brilliance) and physical terms (such as amplitude or intensity) interchangeably.

"Chief rays" are those that pass through the center of the exit pupil of an image defining system, whether refractive or reflective. "Marginal rays" converge considerably towards an image point, such as rays passing through a comparatively wide open stop. The terms "stop," "aperture" and "field" are used in the meaning common in geometrical optics; "field" includes the practically usable image surface or surfaces of a device such as for example the actual recording film frames of a motion picture strip in a camera or the practically usable portions of cathode ray tube screens.

An "optical interference coating" (or "coating" for short) consists of at least two "layers" of transparent media of different indexes of refraction. Such coatings are applied to a linking surface or surfaces of a carrier or supporting body of optically suitable material.

Beam linking devices such as light dividing or combining coatings have heretofore been provided with non-parallel surfaces, but not in contemplation of the problem of controlling and mutually balancing the distribution over a field or fields of values including those relating to hue. Metallic transparent reflector coatings have been made wedge shaped in order to compensate for variation of the reflection factor with the angle of incidence of light on an oblique light dividing surface, since the reflection factor is also a function of the thickness of the metallic film. In other words, since both a larger angle of incidence and a thicker coating increase the reflection, a film which is thinner in the area where the incident light strikes at a more oblique angle, will compensate for variation of the reflection factor across the field. In the practical instance of a partially silvered reflecting surface carried within an optical cube behind a lens system at 45° to the system axis, the silver coating should be slightly thinner at the edge towards the image and thicker at the edge towards the lens. It has also been proposed to make interference layers wedge shaped in order to render anti-reflection coatings more neutral; such wedges involve only a single dielectric layer, are not matched to any optical system and do not take into consideration either a given reflection band or particular ray angles. It has further been proposed to use stepped interference coatings for the purpose of making more finely graduated interferometer measurements, without regard to energy distribution over a field.

The effect of an optical interference coating, such as a dichroic reflector, on the uniformity of convergent light passing therethrough is quite different from that of a metallic reflector. The reflection factor (that is the ratio of the amplitudes of light incident on, and reflected from a surface) at any one interface is independent of the thickness of the adjacent layers, so that the reflectivity variation with angle of incidence cannot be compensated by increasing the coating thickness as is possible in the case of a metallic coating. Also, the detrimental effect of the cross field variation in brightness of a metallic linking structure is negligible as compared to the usual effect of wave length variation occurring when the rays of a beam strike an optical interference coating at various angles. This is due to the fact that the reflection bands of such a coating are caused by interference between rays reflected from the interfaces of the coating as functions of the phase relations between the reflected rays. The phase relations depend on the geometry of the system, as defining differences between different reflection routes. The path differences become less as the angle of incidence increases, and the reflection bands accordingly shift toward shorter wave lengths with steepening angle.

I found that brightness distribution can be only controlled to a limited degree in the case of optical interference coatings as compared to metallic transparent reflectors, whereas the wave length distribution characteristics can be controlled according to the invention without adversely interfering with the brightness distribution.

It is not immediately evident that a wedge shaped interference coating should be able to correct the cross field shifting of color bands. It is indeed theoretically impossible to obtain the same spectral reflection characteristics for rays traversing an optical cube at all possible angles. However, it is possible, in accordance with the principles of the present invention, to satisfy certain somewhat less severe but still quite satisfactory requirements such as that for given practical conditions the wave length distribution across the field should predictably conform to certain standards, particularly as to band width and intensity distribution within a selected band. Often it is not necessary to have interference coatings with perfect color characteristics because compensation can be obtained by utilizing in combination with these characteristics the spectral cuts in a camera system with filters and emulsions primarily selected for their color rendition characteristics, as for example dealt with in copending application Serial No. 66,528, now abandoned.

The characteristic principles of the invention and the broadest aspects of construction according thereto will now be explained with reference to Figs. 1 to 6.

Fig. 1 indicates at O an optical system, refractive or reflective, or both, which provides an image carrying beam indicated by axial rays *b*, *g* and *r* and has an exit pupil E′*p* which defines, as shown in Fig. 2, three chief ray pencils P*c* and three marginal pencils P*m*1, P*m*2 and P*m*3 centered on these chief rays. A beam linking, in this instance light dividing member C*w*, wedge is interposed between the pupil and the image surface M1, producing images at surfaces M1 and M2. For the sake of simplicity, only the transmitted rays are shown in Fig. 2. It will be understood that O can be a camera objective, that C*w* can be incorporated in a prism body and that conventionally appropriate instrumentalities are provided for holding image-receiving elements such as films or screens at the focal planes M1 and M2. Assuming by way of example that the beam linking surface is a dichroic reflector as disclosed in my above application, the transmitted and reflected beams are characterized by specific spectral ranges, indicated in Fig. 1 by rays *b*, *g*, *r* and transmission-reflection diagrams shown adjacent the respective focal planes M1, M2. In this example the intermediate or green spectral range is reflected so that a green aspect image is effective at M2 and a blue-red (magenta) image at M1. It will be understood that the curves representing the spectral ranges are only approximate. In the following description referring to Fig. 4, these spectral ranges will be indicated by cross marks such as associated in Figs. 1 and 3 with a transmission minimum in the transmitted beam.

Fig. 3 illustrates, for purposes of describing the present correction technique with reference to Figs. 4 to 6, the relation of the thickness $t$ of an optical interference coating C, the angle of incidence $\varphi$ of a light ray P, and the wave length $\lambda$ of the reflected and transmitted rays P*r* and P*t*. As diagrammatically indicated in Fig. 3 with arrows $a\varphi$ and $at$, an increase of angle of incidence $\varphi$ causes a shift towards lower wave lengths, whereas an increase of layer thickness $t$ and hence longer paths causes a shift towards higher wave lengths of the transmission minimum.

Fig. 4 indicates the spectral changes in several typical paths passing an optical interference coating C*p* of conventional uniform thickness shown in column A on the left hand side, and correspondingly passing a wedge shaped coating C*w* according to the invention, in column B on the right hand side. It will be understood that the beam linking coating $Cw$ can be applied to supporting bodies of any desired type; for example, cubes according to Fig. 7, or flats according to Fig. 10 can be used.

In the example illustrated in Figs. 1 to 4, it is assumed that white light parallel to the system axis S is divided into transmitted blue and red beams and a reflected green beam as indicated for the uppermost pencil $Pu$ at column A, row I of Fig. 4. It will be understood that everything said herein for color characteristics in the reflected beam is equally true for the transmitted beam; for the sake of simplicity only the transmitted beam is shown in, and discussed with reference to Fig. 4 and the reflection band maxima, which correspond to minima of the transmission bands, are indicated by crosses in the manner of Figs. 1 and 3.

The thickness of the wedge $Cw$ approximately at its center is assumed to be equal to the thickness of the uniform coating $Cp$, so that axial rays transmit the same spectral range in both instances, marked A for parallel surface coatings and B for wedge coatings.

At row I of both columns A and B (herein for short written "I–A–B") of Fig. 4 are shown three parallel rays, an upper ray $Pu$, an axial ray $Pa$ and a lower ray $Pl$. Passing through the uniform coating $Cp$ as shown in column A these rays have identical reflection bands, but the wedge coating $Cw$ at column B shifts the bands towards shorter wave lengths as the wedge becomes thinner, compare Fig. 3. This shift is herein referred to as "thickness shift." The bands are indicated with crosses, in the above-mentioned manner, for each one of three points *o, p, q* on image plane M1. These rays and points are also shown in Fig. 2.

At II–A–B of Fig. 4 are shown three rays which intersect at the center of the dichroic coating, an upper diagonal ray $Pdu$ (in $Pm1$ of Fig. 2), an axial ray $Pa$ (in $Pm2$ of Fig. 2 and identical with $Pa$ at I), and a lower diagonal ray $Pdl$ (in $Pm3$ of Fig. 2). Since for all practical purposes the thickness of $Cp$ and $Cw$ is the same at the point of intersection of the diagonal rays, the band shift is identical at II–A and II–B, not due to thickness change but rather to change of angle of incidence, which, as explained above with reference to Fig. 3 is a shift towards shorter wave length with increasing angle of incidence. This is herein referred to as "angle shift."

It will be noted that neither of the so far discussed ray configurations is image forming. However the effect, upon these rays, of uniform coatings $Cp$ and wedge coatings $Cw$, respectively, corresponds to that upon image forming rays now to be discussed, thus permitting an empirical but fully correct and practically sufficient explanation of the principles forming the basis of the invention.

At III–A–B, Fig. 4 shows a group of rays ($Pc$ of Fig. 2) diverging from the center of the exit pupil E of an image forming system, such as a lens or mirror. As well known, the exit pupil is the image of the stop of such a system as seen looking towards the lens. These rays are usually referred to as chief rays and they are at III of Fig. 4 denoted as upper chief ray $Pcu$, axial ray $Pa$ (the same as at I and II), and lower chief ray $Pcl$. The wave length and amplitude characteristics of these chief rays govern the hue saturation and brightness of the image points across the field when the imaging system is stopped down to a small aperture as indicated by the small diaphragm E at III. As well known, these chief rays are essentially equivalent to the image carrying light available in a pin hole camera.

With a conventional coating $Cp$ at III–A, the upper chief ray $Pcu$ will exhibit a shift towards shorter wave length, corresponding to that of ray $Pdu$ at II–A although to a lesser degree due to the smaller angle of incidence.

Coming now to the wedge coating $Cw$ at III–B, this diagram indicates the same reflection band for all three rays, the wedge being in accordance with the present invention so dimensioned that the thickness shift wholly compensates the angle shift. Referring to Fig. 3, it will be remembered that an increasing angle of incidence corresponds to shorter wave length reflection whereas increasing thickness corresponds to longer wave length reflection; hence steeper incidence can be compensated by a longer path. A technique for deriving the compensating configuration of the coating $Cw$ will be presented herein below.

It will be evident from Figs. 2 and 4 that the exact shape of the wedge coating depends upon the distance of the exit pupil from the linking surface, since this distance governs the angle of incidence at a given point thereof, the compensating thickness required, and hence the wedge or thickness gradient of the coating $Cw$.

In rows IV, V and VI of Fig. 4, the image forming rays through a large stop are indicated. The behavior of these rays corresponds to that of the rays parallel thereto in rows I, II and III.

Assuming that the wedge is designed fully to compensate for spectral shift of the chief rays, the wave length shift under open stop conditions will now be considered. At IV, an upper marginal ray $Pu$, a central ray $Pma$ and a lower marginal ray $Pdu$ are shown to image a point *o*. At V an upper ray $Pmu$, an axial ray $Pa$ and a lower ray $Pml$ image a point *p*. At VI, an upper ray $Pdl$, a central ray $Pmb$ and a lower ray $Pl$ image at point *q*. It will be evident that the wave length shifts for these rays can be deduced from those occurring in situations I, II and III; rays $Pu$ of IV, $Pa$ of V and $Pl$ of VI correspond to the parallel rays at I, $Pdu$ occurs in II and IV, and $Pdl$ occurs in II and VI. Rays $Pma$ and $Pml$ of IV and V correspond to $Pcu$ of III, and rays $Pmu$ and $Pmb$ of V and VI to $Pcl$ of III. The corresponding shifts are clearly indicated in Fig. 4, for both uncorrected and corrected coatings $Cp$ and $Cw$ at A and B respectively. It should be kept in mind that the lines carrying the *x*-marks do not correspond to selected lines of the image surface but are the wave length axes of abscissas such as in Figs. 1 and 3, one axis for a respective ray. At IV, V and VI these rays represent pencils imaging points *o, p* and *q*, respectively.

Although the reflection band shifts are above explained on a purely empirical qualitative basis, corresponding quantitative values can be obtained by accurately introducing and computing the respective path lengths, angles of incidence and refraction, and thicknesses (wedge configuration) of the coating. For most practical purposes, empirically derived dimensions are fully satisfactory. An appropriate technique for determining the wedge shape and for coating a wedge will be described below.

Having in mind that the spectral quality of each image point is the combined effect of the wave lengths and intensities of all rays reaching that point, according to the well known rules of additive color blending, the overall quality of the image fields according to Fig. 4 will now be discussed with reference to Figs. 5 and 6 which, as clearly indicated, show the net or overall reflection and transmission bands resulting from the above discussed situations III to VI. Figs. 5 and 6 illustrate in the upper diagrams the wave length conditions at points *o, p* and *q*. The lower diagrams of Figs. 5 and 6 illustrate the combined characteristics over the entire field $Ml$.

Fig. 5 indicates that the reflection characteristics for points at A–III–IV–V–VI vary considerably, so that hue varies across the field. On the other hand, as indicated in Fig. 6, the corrected interference coating furnishes identical combined color values for each point and hence equal color distribution over the field.

While the band is satisfactory for situation III, the effective bands for B–IV–V–VI are somewhat wider than those for A–IV–V–VI, but they are centered at the same wave length, which is of main importance although accompanied by a slight desaturation due to the greater shifts at B–IV–V–VI individually, as compared to the shifts at A–IV–V–VI.

The wedge correction depends to some degree on the principal wave length to be provided by a particular coating. In apparatus incorporating more than one coating, the wedge gradient will depend on the peak reflection wave length of the respective component coating; thus, a red reflecting coating might not require the same degree of wedge correction as a blue reflecting coating. This feature will be discussed hereinbelow with reference to a practical embodiment which comprises two coating components of different selectivity.

Fig. 6 clearly indicates that a properly constructed wedge coating effects approximately uniform spectral distribution over the image field, whereas with an uncorrected coating as in Fig. 5, the shifts vary for the different points, which introduces falsification of color separation. This difference prevails for small as well as large stops as will be evident from a comparison of rows III and IV–V–VI, respectively, of Fig. 4. Thus, correction of the reflection bands of the chief rays, for a certain exit pupil location, results in fairly favorable spectral distribution of the reflection bands for all rays including those admitted by wide stops.

Since the peak wave lengths of the reflected and transmitted bands can be most easily controlled by adjusting the layer configuration during production of the coatings, the quantitative characteristics of the two other parameters of the bands have not been discussed in detail above. However, these parameters, namely the intensity or reflectance, and the physical purity or band width measured at one half the peak reflectance value, are likewise affected by the cosine of $\theta$, the refractive angle within each layer, and these effects will now be explained with reference to Figs. 7 to 13. Fig. 9 indicates angles $\phi$ and $\theta$.

Fig. 7 indicates, in the manner of Fig. 5, the effect of a coating *Cp* of uniform thickness which intersects a fan of rays coming from a small entrance pupil E such as shown in III–A of Fig. 4. In Fig. 7, the above mentioned values of central wavelength (hue), maximum reflectance (brilliance) and band width (saturation) are more clearly illustrated for each of the rays P*cu*, P*a*, P*cl* at points *o*, *p*, *q* of Fig. 4, the curves which indicate these values being correspondingly designated *o*, *p*, *q*, in Figs. 5 to 8. It will be noted that peak reflectance and band width are distinctly different for the respective rays; they increase with decreasing angle $\theta$ and hence with increasing peak wavelength.

If the thickness of the coating is made inversely proportional to the cosine of $\theta$ of rays P*cu*, P*a* and P*cl* (at *o*, *p*, *q* respectively) as indicated at III–B of Fig. 4, then the reflection maxima which are representative of hue will all coincide at the peak wavelength of ray P*a*. This situation is illustrated in Fig. 8 which corresponds to the upper, "stopped down" diagram of Fig. 6. A coating configuration according to Fig. III–B of Fig. 4 with the wedge angle conforming strictly to the cosine $\theta$ relation and resulting in uniform peak hue according to Fig. 8, is proper if it is desired to keep the hue distribution identical for all rays, in spite of accompanying variations in brightness and saturation across the field. This situation is not always acceptable for practical purposes of color reproduction or transmission where it is generally speaking detrimental to hold the wavelength of the peak reflection constant across the field. In color photography for example it is desirable that all rays of the field should produce equal densities on the photographic film if the incident light is uniformly white; in colorimetric terms this means that a uniformly gray field is rendered uniformly gray. The situation according to Fig. 8 is generally speaking least detrimental if the body which supports the interference coating is a flat plate and the coating comprises relatively few layers. On the other hand it is hardly acceptable if the coating is within a glass cube, because this construction in most instances calls for smaller index differences between adjacent layers and hence a greater number of layers.

In accordance with the invention the total luminous energy at a given image plane can be maintained constant across the field at its aperture, by means of peculiarly dimensioned optical interference coatings, if desirable, assisted by correcting absorption filters. This aspect of the invention is based on the following considerations.

The effect of a uniformly thick dichroic interference reflector upon a divergent beam can be described in terms of certain above mentioned color defining parameters as follows. As the ray angle $\theta$ increases, (1) the wavelength at which a certain arbitrarily selected reflectance occurs on the short wavelength side of the band in question (for short referred to as the "short cut-off") decreases, (2) the wavelength at which a certain arbitrarily selected reflectance occurs on the long wavelength side of the band (for short referred to as "long cut-off") also decreases, but at a much greater rate than the short cut-off, and (3) the maximum value of reflectance decreases. It will be noted that the third parameter, namely the maximum value of reflectance, has been considered above, whereas the parameters "short cut-off wavelength" and "long cut-off wavelength" have not yet been discussed. Taken together these form a more convenient means of describing the same phenomena as included in the concepts referred to above with the two terms "band width" and "peak wavelength." While the third parameter, namely the maximum value of the reflectance (or the minimum of the complementary transmittance) cannot be controlled by variation of the wedge gradient, it is possible to vary in that way either one, although not both of the cut-off wavelength parameters, as follows.

It is possible by a suitable choice of the wedge gradient to make the spectral transmittance curves for various rays coincide at any desired wavelength on either side of the peak. The thickness of the layer at any particular point is then no longer inversely proportional to cos $\theta$ of the chief ray at that point. The wavelength where the reflectance-transmittance curves of selected rays coincide, herein referred to as cross-over wave length, will depend on the steepness of the chosen wedge gradient of the coating. This cross-over wave length controls the cut-off of the transmission-reflection bands, in the manner now to be discussed with reference to Fig. 9.

Fig. 9, similar to Figs. 7 and 8, represents the small aperture situation III–B of Fig. 4, but with the difference that the wedge gradient of coating C*x* is steeper than 1/cos $\theta$. For the sake of simplicity, Fig. 9 shows only a steep ray *u* and a nearly normal ray *n*, and the transmission-reflection curves (similarly labeled) of these two rays. From the above discussion of Figs. 4 to 8 it will be evident that the reflection peak of ray *u* is at a higher wavelength as compared to that of ray *n*. The reflection factor for both rays will be the same only at one point, namely at the cross-over point X at the wavelength $\lambda_x$. The steep ray *u* has less reflection on the left-hand side of the cross-over point as compared to that of the normal ray *n*, whereas on the right-hand side the normal ray *n* has less reflection than the steep ray *u*. The wavelength bands on either side of the cross-over point can be equalized by properly selecting the respective differences between the areas defined by the two curves on respective sides. As indicated in Fig. 9 by cross hatching, the areas of difference for the two curves between wavelengths *l* and $\lambda_x$ is equal and opposite to the difference area between wavelengths $\lambda_x$ and *h*. Thus, the reflected luminous energy average over the wavelength band from *l* to *h* will be the same for both rays, and this wavelength band of the same average reflection for both rays will include the cross-over point X. All the rays across the field, between rays *u* and *n*, will carry nearly equal amounts of light to the aperture, within a band restricted to the region between wavelengths *l* and *h*. If the system at hand permits such restriction and if the restricted band is broad enough for its purpose, this favorable distribution of luminous energy can be taken advantage of. This is possible for many purposes including most branches of color photography, where the light outside of desired regions can be excluded by such means as absorption filters or made ineffective by way of sensitivity characteristics of a light sensitive or modulated element. It should be kept in mind that this does not mean that all rays of the field would appear to be of the same color to the eye; in general they would not. However this does mean that all field rays would produce equal densities on the photographic film with uniform white light entering the system and, as mentioned above, it does mean in colorimetric terms that a uniformly gray object field will be rendered by the camera as a uniform gray. There might be slight variations of color rendition of very brightly colored objects across the field, but these are far less objectionable on the screen than the presence of any non-uniformity in a gray field.

It will be apparent that the above explained principle can be directly applied to systems according to Fig. 1 wherein the green region is reflected.

The above principle will now be further explained by way of its application to apparatus according to Figs. 11 to 13 with two separate interference coatings, one of which reflects short wave length (mainly blue) light whereas the other reflects long wave length (mainly red) light, and both transmit the intermediate spectral region commonly referred to as the green range. Fig. 11 shows a double coating C*w* of this type within a camera, and Fig. 12 indicates the blue reflecting coating C*w*1 and the red deflecting coating C*w*2. In this embodiment it is essential to have a well defined green band of optimum intensity and uniformity in the sense above pointed out, namely one providing rendition of a gray field as an essentially gray photographic color record. As indicated in Fig. 10 the blue reflecting band is controlled similarly as in Fig. 9, namely with its long wave length cut-off held approximately constant by making the wedge gradient of the short wave reflecting coating C*w*1 somewhat steeper than according to theoretical considerations. On the other hand the long wave reflector C*w*2 is flatter so that the short wave length cut-off of its reflection band is held approximately constant. The respective cross-over points are indicated as Y and Z, at wave lengths $\lambda_y$ and $\lambda_z$. The comparatively slight transmission on either side of the intermediate band, namely the regions to the left-hand side of $\lambda_y$ and at the right-hand side of $\lambda_z$, can be easily trimmed by conventional means. For one frequently used commercially available green recording emulsion, the short wave cut-off is corrected by means of a conventional yellow or minus blue absorption filter indicated at A*y* of Fig. 11, whereas this emulsion is inherently insensitive to the higher wave length region beyond $\lambda_z$ at the long wave cut-off. The unbalanced ends of the reflected red and blue bands are both beyond the spectral range which is used for color photography and therefore they can both be radically trimmed off without sacrifice of speed. On the blue end this can be accomplished by means of an ultraviolet absorbing filter, and on the red end by means of an appropriate filter or preferably simply by reliance on the fact that the usual emulsions for recording the red aspect are insensitive to longer wavelengths. Filters of this type are indicated in Fig. 13 wherein a blue reflecting and a red reflecting coating are crossed within a cube prism. Such a device has three apertures each of which can accommodate an absorption filter if the films or other light modulated media S*b*, S*g*, S*r* so require. A blue transmitting filter is indicated at A*b*, a green transmitting filter at A*g*, and a red transmitting filter at A*r*. Filter A*b* trims the curve shown above S*b*, and A*g* and A*r* do the same for the curves at S*g* and S*r*. It will now be evident that the average energy of the three ranges can be uniformly distributed by limiting them as pointed out above with reference to Fig. 9 and that, furthermore, the nearly constant wavelength cut-offs according to the invention obviate the use of speed reducing absorption filters, as explained with reference to Fig. 10.

Referring to Fig. 10, it will be noted that the narrowest band width reflected at the greatest of the refractive angles, such as of ray *u*, is broad enough to eliminate from the useful spectral range, such as the long and short wavelength ranges of Fig. 10, the variations with smaller angles, such as of rays intermediate rays *u* and *n*, in the uncontrolled cut-offs namely the longer wave cut-off at $\lambda_y$ of coating C*w*1 and the shorter wave cut-off at $\lambda_z$ of coating C*w*2, by equalizing the energy variations within the useful ranges reflected by the respective coatings, as explained above with reference to the shaded areas on either side of the point X of Fig. 9.

It will now be apparent that mere coincidence of peak wavelength for various field rays such as indicated at III–B of Fig. 4, or symmetrical configuration of the transmission-reflection curves for various field rays as indicated in III–B to VI–B of Fig. 4, is not always satisfactory. This is especially so in the case of interference coatings that are embedded in prisms which inherently effect a greater variation of band width with field angle, as compared to similar coatings applied to flat plates, although the inverse cosine law in both cases applies to the peak wavelength of any ray incident at a given angle. In the case of flat plates, a wedge gradient which keeps the peak wavelengths constant across the field will very nearly hold both cut-offs constant also. The reason for this is that even at large field angles much higher interface reflection factors can be obtained with the coating materials suitable for flat plate reflectors than with the materials suitable for prisms. However, even plate reflectors are considerably improved by dimensioning the wedge coatings not merely with a view to the cosine relation but also with regard to the cut-off conditions, according to the present invention.

The above described examples, illustrated in Figs. 11 and 13, present a quite favorable instance of compensation over the entire field, because they have the least possible number, namely two, of cut-offs which are critical in a three-color system, and because these critical cut-offs can be independently controlled by way of individual dimensioning of the wedge gradient for each of the two coatings. Considering for example, by way of comparison, a system wherein one coating reflects green and another coating red or blue, it will now be evident that such a system has three critical cut-offs, one on each side of the reflected green range and one on the green side of the other reflected range. Thus only one reflection band, either blue or red, can be limited as described above, with the uncontrolled cut-off beyond the effective recording range, whereas the green range has necessarily either two slightly imperfect cut-offs as in Fig. 8, or one fixed and one undesirably varying cut-off.

Recapitulating that aspect of the invention which is described with reference to Figs. 9 to 13, it comprises in a color selective optical system wherein rays of an imaging system follow divergent paths through this system, a transparent support, and on the support one or more coatings capable of reflecting a selected color band due to interference effects while transmitting the remaining colors, and having a tapered thickness varying according to a ratio which differs slightly but significantly from the inverse cosine of the incident angles of the rays, to present to a selected ray an effective optical thickness which is capable of producing a reflected range having a peak, and to present to a second selected ray a different effective optical thickness which is capable of producing a reflected range having cut-offs which are non-symmetrical. This system can be further combined with means for selecting from a reflection range or ranges an effective band of essentially uniform intensity for the respective rays and all rays with inclinations intermediate thereof.

Although systems with tapered interference coatings that deviate significantly, for the above explained purposes, from the inverse cosine configuration are advantageous in many practical applications, it should be understood that a tapered thickness varying substantially inversely with the cosine of the angles of incidence of the chief rays of the imaging system offer considerable advantages. Such advantages are relatively uniform hue distribution according to Figs. 6 and 8 which is satisfactory if the somewhat uneven total energy distribution can be disregarded. Also, the deviation from a strictly inverse cosine relation, according to the invention, does not detract from the advantages of relating the wedge configuration of interference coatings to the exit pupil of the correlated imaging system for the purpose to be described below with reference to Fig. 11.

It will be evident that, although it is theoretically impossible to obtain perfect correction for all ray paths by way of wedge shaped coatings, it is nevertheless possible to cancel the effect of an intensity change at a given wavelength by way of a reflection band shift for an aperture stop of given location which cancellation is an optimum for a given purpose such as the linking of light beams of selected spectral ranges. Instead of practically uniform color distribution, any desired color gradient can be obtained, from extreme variations obtained with wedges having inclinations opposite to those at B of Fig. 4, through the distribution for parallel interfaces as at A, to full correction for small stops, as in B–III.

It will be understood that spectral adjustment can be provided for purposes other than color reproduction or matching with minimum falsification, by shaping the coating in accordance with the invention, for the purpose at hand.

Incidentally, it will be noted that the wedge inclination of a dichroic interference coating according to the present invention is in the direction opposite to that given to metallic transparent reflectors for purposes of compensating brightness distribution.

It can now be concluded that the above described coating configuration, related to an exit pupil location, provides the following features. These conclusions have been confirmed by practical experiment.

A selectively reflecting interference coating can be designed which will produce, but only in combination with a stopped down imaging system, cross field uniformity of color in any selected spectral region, in the above discussed example in the reflected green and the transmitted blue and red regions; instead of uniformity, any desired distribution can be provided.

Control of configuration of the correcting wedge for a desired compensation can be advantageously related to the location of the exit pupil of the imaging system, such as a lens system, with which the coating is to be used.

A wedge that is related to the exit pupil and which provides practically perfect wavelength uniformity across an image field for very small stops, can be made to produce practically uniform overall effect across the field for large stops, although of somewhat lower saturation which gradually increases as the stop decreases.

These properties can also be stated in the psychophysiological terms of hue, brightness and saturation as follows.

The hue of transmitted and reflected beams can be distributed uniformly or with predetermined variation across the entire field for small as well as large stops, in other words the cross field hue distribution can be made independent of the stop. In this connection it must be kept in mind that, for example for purposes of color photography and television, irregularity of hue distribution in an image plane is the most objectionable defect of an analyzing or combining system.

Brightness distribution cannot be directly controlled by coating configuration because it is independent of the thickness of optical interference layers, but it is not worsened by the hue compensation according to the present invention. It is independent of the stop and comparatively small; the residual brightness gradient is in most instances less than that previously tolerated in metallic reflectors. Besides, brightness variation across the field is not very objectionable since the eye is much less sensitive to change of brightness than to the change of color.

The saturation is very good for small stops and somewhat lower for larger stops, the saturation being a continuous function of the stop diameter. This however is a second order effect and it should be noted in this connection that the separation of the wavelength regions for the various image points is intentionally exaggerated in Figs. 4 and 6. Further, this desaturation can be controlled by way of adjusting the cross-over points and the film and filter cut-offs.

Shortly recapitulating this important aspect of my invention, I use the chief rays for a given exit pupil as a basis for deriving a certain wedge configuration for an interference coating serving as dichroic beam linking device, and find that this configuration provides for favorable color distribution over the image field, for marginally converging as well as chief rays, without detrimental effect as to saturation and brightness.

Coming to a further important aspect of the present invention, the advantageous possibility of using corrected dichroic wedges according to the invention with image forming systems of varying focal length will now be discussed, and a practical embodiment incorporating this feature described with reference to Fig. 11.

In many practical applications, a beam linking device is required to work satisfactorily with image forming systems having focal lengths that vary within a ratio of approximately four to one. Since according to the present invention, the amount of wedge correction of the beam linking interference coating is determined on the basis of the position of the exit pupil of the imaging system, by taking advantage of the fact that the exit pupil and the principal plane of such a system do not necessarily coincide and that the focal length can be changed without changing the exit pupil position, this wide range of operation becomes feasible. It is thus possible to use corrected interference coatings according to the invention with series of lenses of different focal length, if care is taken by the lens designer that the exit pupil of all objective lenses in a series are in approximately the same position relative to the coating.

Fig. 11 shows in cross section the optical component of a color motion picture camera of the type described in Patent No. 2,072,091 of March 2, 1937, to J. A. Ball et al. In such cameras a lens tube L for a lens system O is mounted on the door 24 of front wall 21 of the camera housing 6, by means of clamp screws 26 which engage a flange 27 of the lens tube, firmly pressing it against the accurately finished face 28 of the door 24. A light dividing prism P1, P2 is mounted on a central supporting block 51 that is rigidly fastened to the camera housing proper 6. The block 51 supports aperture plates 61 and 62 and back plates 63 and 64 which carry film movements or gates for appropriately guiding and registering films F*b*, F*g*, F*r*, films F*b* and F*r* forming a so-called bipack. This construction is shown and described in detail in the above mentioned patent with reference to Figs. 4, 9 and 19 thereof.

The lens system O may assume various forms within a series, three forms being schematically indicated in Fig. 11. At O1, a conventional lens system of intermediate focal length is indicated, whereas O2 is a long focus telephoto lens and O3 a short focus, so-called reverse telephoto lens.

In each diagrammatic showing of these lens systems, P′ indicates the principal plane, F the image plane, S*p* a stop, E′*p* the exit pupil, *f* the focal length, P′*a* a marginal ray, and P*ca* a chief ray. It will be noted that image planes F coincide with the recording surfaces of films Fb, Fg and Fr and that the optical components of all three systems are accommodated within tubes indicated at L1, L2, L3, of the approximate shape of tube L. The exit pupils E'p are retained at approximately the same distance from F, by appropriately locating the lens elements relatively to flanges 27.1, 27.2 and 27.3. By arranging the components in this manner, the exit pupils of these or other lens systems can be maintained at equal or sufficiently nearly equal distances from the coating and the image planes, in accordance with the above described principle of relating the wedge correction of the optical interference coating Cw to the exit pupil, thus providing for the interchangeable use of various lens systems.

Because the location of the exit pupil is the basis for the wedge correction of the coating, exchange of prisms with different wedges for use with different imaging systems becomes unnecessary which is of primary importance in view of the difficulties involved in proper adjustment of such systems. Several prisms would be required if wedge adjustment for proper operation with different lens systems were made with reference to the focal lengths of a series of lenses. This would occur if the exit pupil were located at the principal plane for a wide range of focal lengths.

The distance between exit pupil and coating is not particularly critical. It was found by actual tests that by holding this distance essentially constant, a prism having an optical interference coating that is wedge corrected as above described, will not exhibit any detrimental color variation across the field if used with any one of the lens systems of the type indicated above. Variations within a ratio of two to one can be tolerated in the exit pupil to image plane distance without much detrimental color variation. Thus, a single wedge correction is satisfactory for a series of lenses designed within a wide margin of variation with regard to other properties.

A prism according to the invention for use in the above described camera system will now be described by way of example, with reference to Fig. 12. This figure shows only portions of the prism to permit indication of the characteristic properties of the interference coatings. Identical reference characters are used for similar elements in Fig. 12 and previously discussed figures.

An optical interference coating for purposes of camera arrangements such as shown in Fig. 11 comprises two component coatings, one for reflecting the blue and one for reflecting the red light, whereas both transmit green light. While the number of layers is not very critical, a fairly high number is used in order to provide high reflection intensities and steep spectral cuts. In a successful practical embodiment, a blue reflecting coating with twenty layers and a red reflecting coating with nineteen layers was used, the layer materials being zinc sulphide for the high index and lead fluoride for the lower index layers. The coatings may be applied, by appropriate evaporation methods, to respective faces of prisms P1 and P2, or all layers of both coatings can be coated directly on top of each other on the hypotenuse surface of one component prism, for example P1, whereupon the coated surface is cemented to the uncoated surface of the other prism such as P2. The numerical data for the coatings are indicated in Fig. 12, where $n$ indicates indexes of refraction. The $nt=\lambda/4 \cos \theta$ values which depend on the wave length in question are referred to the center of the wedge layers where they intersect the system axis Pa (Figs. 4 and 12) at 45° with $t$ measured perpendicular to the coating.

As explained more in detail hereinbelow, the coating configuration, specifically the wedge gradient, is determined empirically, by relating optical measurements of actual coatings to the angles at which the surfaces to be coated are supported in the evaporating apparatus. Satisfactory results have been obtained by applying the blue reflecting coating to the prism surface, tilted at an angle of 12° to the plane in which uniform coating thickness is produced in suitable apparatus, and by applying the red reflecting coating with a tilting angle of 8°. This example is of the type described with reference to Figs. 7 and 8 wherein the color distribution is purposely distorted from the theoretical requirement for effectively uniform optical thickness as illustrated in Figs. 4 and 6, in order to obtain photographic uniformity as controlled by the cut-off wavelengths of the filters and emulsions thereof. As explained above, this is accomplished by giving the long and short wavelength reflecting layers comparatively smaller and larger wedge gradients, respectively.

It will be understood that the principles of the invention can be applied to beam linking systems of various types, and by way of example three further characteristic embodiments will now be shortly described with reference to Figs. 13, 14, 15 and 16.

Fig. 13 shows a three aperture light divider, sometimes referred to as X prism, suitable for use in cameras with three separate films and film movements.

The device according to Fig. 13 has four component prisms P5, P6, P7, P8 and two optical interference layers Cw3, Cw4. Assuming that film Sb records the blue, film Sg the green, and film Sr the red color aspect, coating Cw3 is of the type of Cw1, and coating Cw4 of the type of Cw2, both described above with reference to Fig. 12.

The transmission-reflection properties of these two coating are indicated in Fig. 13 with diagrams which are somewhat similar to those of Fig. 1, although it will be noted that Fig. 1 gives the combined reflection-transmission properties for each component beam whereas Fig. 13 gives these properties for each coating. In view of the general description, contained in the above copending application, of the use of such devices in cameras, and in view of the above description referring to Fig. 12, it is believed that Fig. 13 is self-explanatory as to all essential features. Needless to say, the coatings Cw3 and Cw4 are dimensioned with reference to the exit pupil of lens system O4, as above set forth.

Fig. 14 illustrates the use of corrected coatings according to the invention in television equipment of the type described in RCA Review, vol. VII, pages 459 et seq. In this figure, a cathode ray tube 21 provides a flying spot trace 22 on its screen 23. This moving light source illuminates in known manner a color film 25 which is by suitable means stepwise advanced after scanning of each frame by the flying spot. A conventional illuminating and projecting lens system O5, O6 defines an exit pupil E6. The beam P6 images the flying spot, as modulated by the film, near the cathode of phototube 30g. Two beam linking surfaces are provided by interference coatings Cw6 and Cw7. Coating Cw6 reflects blue light towards phototube 30b and transmits green and red light towards the other coating Cw7 which in turn reflects red light towards phototube 30r and transmits green light towards phototube 30g.

The coatings Cw6 and Cw7 are corrected according to the principles of the invention, with relation to the distance between the exit pupil E6 and the image surface. The physical structure of the coatings can be analogous to that described with reference to Fig. 12.

Still another practical application of the invention will now be outlined with reference to Fig. 15 which shows diagrammatically a television receiving system of the type described in RCA Review, vol. X, pages 504 et seq.

In Fig. 15, three kinescopes 41, 42, 43 are combined with image forming systems of the well known Schmidt type, each having spherical mirrors 45 and a compensator 46. Two crossed interference coatings Cw8 and Cw9 combine the blue, green and red color aspect images emitted by the screens of tubes 41, 42, 43. Coating Cw8 reflects the blue and transmits the red and green ranges, whereas Cw9 reflects the red and transmits the blue and green ranges. Thus the three images are properly combined on screen 51. While the color selectivity of the interference coatings can be assisted or essentially replaced by selective tube phosphors and color filters, the dichroic interference filters nevertheless have the important energy saving function of passing on practically all light of a given spectral range, as distinguished from metallic reflectors which inherently waste more than 75% of the incident light, since they reflect and transmit practically without spectral discrimination. With systems of this type uniform color distribution across the screen is of particular importance and can be achieved with coatings that are corrected in accordance with the present invention.

A practical technique for the measuring and hence controlling of the wedge gradient of interference coatings according to the invention will now be described with reference to Figs. 16, 17 and 18.

This technique can be applied advantageously with the evaporation appartaus and according to the method as disclosed in Patent No. 2,771,055 it being however understood that it can be carried out with other properly adapted coating techniques.

Fig. 16 schematically indicates a coating consisting of a selected number of interference layers, such as shown in Fig. 12 whether enclosed within a carrier body or applied to a surface of a flat plate.

The coatings are dimensioned starting with the optical relations defined by the first order interference equation for quarter wave reflection peaks, namely $nt \cos \theta = \lambda/4$ wherein $t$ is the layer thickness, $n$ the refractive index, $\theta$ the angle of refraction of the traversing ray, and $\lambda$ the wave length of the reflection maximum. The direction and relative magnitude of the wedge gradient is approximately predetermined as outlined with reference to Figs. 4 to 6, for the particular purpose at hand which may require optimum uniformity of color distribution or other predetermined distribution over the field or fields of the device in question. Coatings are then made whose dimensions are derived from a preliminary correlation of the data which have been computed as mentioned above with previous calibration data in terms of inclination of the surface being coated within the evaporation apparatus, and of thickness monitoring data, all based on the known performance of a given coating apparatus.

The coating is then tested spectrophotometrically, with rays parallel to each other and the system axis, incident at two different points separated by a known distance as indicated in Fig. 16. Assuming that the device in question employs a 45° linking surface, the angle of incidence is 45°. It will be understood that other angles are feasible.

The peak wave length is measured at the two points 1 and 2, separated by distance $k$. Thus two wave lengths $\lambda_1$ and $\lambda_2$, separated by an amount $d$ are obtained. Assuming that equal portions of the wedge effect are contributed by all layers of the coating and that the contributions of the layers of each material are approximately the same, which assumption was found to be acceptable for practical purposes, the thickness difference $D = t_1 - t_2$ can be expressed in terms of the above interference equation as $$D = t_1 - t_2 = d/4n \cos \theta$$

Fig. 17 indicates the spectrophotometric curves and the above mentioned values $\lambda_1$, $\lambda_2$ and $d$. This pair of curves was obtained from a coating of the general type herein described with reference to Fig. 12.

The refractive indexes of the materials used for the respective alternate layers are known and therefore the ray angles in each layer can be calculated from Snell's law. These traversing angles $\theta_h$ and $\theta_l$ for the high and low index layers, respectively are indicated in Fig. 18, with the angle of incidence $\varphi = 45°$ as initially assumed.

Fairly accurate results are obtained by coating alternate layers at the same (mechanical) wedge gradient, regardless of the difference of refractive indexes of alternate layers. This constant wedge gradient has an intermediate value between the two gradients required for individual compensation of the layers with highest and lowest index of refraction, within the coating. The thickness of each individual layer being inversely proportional to the cosine of the angle of refraction of a ray within that layer, a ray angle intermediate those for the respective individual layers, for the coating as a whole, of thickness $t_2$, $t_1$ at the given points, will thus be obtained, giving fairly accurate practical results.

By substituting in the above formula the known values for the wavelength shift $d$, and the individual indexes $n$ and angles $\theta$, or the above discussed intermediate values, the thickness difference $t_1 - t_2$ can be calculated for the given distance $k$, which might be in the neighborhood of 25 mm., measured parallel to the coated surface.

In this manner the gradient initially assumed for the given optical system is checked and, by a comparatively short series of experimental coatings, standards are obtained for any particular specific requirement regarding color distribution across the field as determined by the coating wedge.

Theoretically accurate control of the individual layer thickness has been found to be impractical, due to the necessary superimposition of a comparatively large number of layers within a coating and the uncertainty that each single layer actually corresponds with theoretical accuracy to a corresponding monitor layer. Nevertheless, the herein described and referred to optical and evaporation technique expedients serve very well for arriving at coating dimensions which by their actual performance prove the correctness of design according to the present invention.

It will be understood that the exact wedge shape depends not only upon the theoretical considerations discussed with reference to Figs. 4 to 10 but to a large degree also upon the purpose at hand. In the specific embodiment described with reference to Figs. 11 and 12 for example, the coating configuration depends on the photographic recording process in question, that is mainly on the commercially available emulsions used and the auxiliary or marginal filters adopted for use therewith. The above described experimental measuring and controlling technique has to take into account and experimentally to include the optical properties of the installation as a whole, such as sensitometric characteristics of films, photometric properties of filters, sensitivity characteristics of phototubes and iconoscopes, and reflection, absorption and emission characteristics of projection screens and kinescopes. Thus it is impossible to give precise numerical data for exact theoretical prediction except for some particular purpose.

By way of example, the following data are given for a color motion picture system according to Figs. 11 and 12. In this practical embodiment, the thickness difference $t_1 - t_2$ was found to be approximately 4.5 m$\mu$ for zinc sulphide layers and 5 m$\mu$ for lead fluoride layers in both the red and blue reflectors, for points 27 mm. apart on the hypotenuse of the prism.

Under certain circumstances it becomes preferable to vary the color distribution to a predetermined degree depending upon the system as a whole, the main aim being to hold the speed or sensitivity of the entire system constant over the width of the picture. For that purpose the wedges must be so chosen that the filters and film sensitivities accomplish the function which the wedge cannot perfectly perform because the width of the reflection band changes with the ray angle. By way of example it may be stated that in a system according to Figs. 11 and 12 it is preferable to hold the longer wave length side of the blue reflection band approximately constant and to allow an ultra violet absorbing filter (either a separate filter at the bipack aperture, or the interference layer material if appropriately chosen, for example zinc sulphide) to control the spread of the blue beam on the shorter wave length side. On the other hand the shorter wave length side of the red reflection band can be held constant at various field angles. It is not detrimental if it spreads into the infrared for angles approaching the normal, because the red sensitivity of the film material used in the specific embodiment cuts off on the longer wave length side so that the band spread in this direction has very little effect. It will thus be seen that there is no need to hold the peak of the reflection band absolutely constant, although the wedge configuration of the interference coatings is used with rather precise dimensioning for a definite and beneficial purpose. This dimensioning can best be arrived at empirically as described above, after testing several different prisms with various amounts of wedge in the optical system for which the coating is intended, relating the actual performance with the coating technique proper, including the tilting of the surface during coating in the evaporator. As mentioned above, in the example according to Figs. 11 and 12, these angles were 12° for the blue and 8° for the red reflector.

In prisms of the general type of Fig. 13, but with one red transmitting, blue reflecting and one red transmitting green reflecting interference coating, satisfactory cross reflectors have been coated with the tilting angle in the evaporator of 13° for both blue and green reflectors. Tilting angles from amounts as low as about 3° up to about 30° have been found to be useful, depending upon the purpose at hand.

Generally speaking, interference coatings according to the invention combined with image forming and image transforming and presenting systems, provide simultaneous compensation of variations of one or more of the above discussed color characteristics, in a plurality of beams linked by a coating or coatings, by means of the thickness configuration imparted to the coatings, as herein described.

It should be understood that the present disclosure is for the purpose of illustration only and that this invention includes all modifications and equivalents which fall within the scope of the appended claims.

I claim:

1. In a color selective optical device wherein rays of an imaging system follow divergent paths through said device; a planar transparent support oriented obliquely to said rays; on said support a dichroic coating having several layers of dielectric material of alternatingly different indexes of refraction and capable of reflecting a selected color band and of transmitting the remaining colors of the visible spectrum due to interference effects, said rays striking said support at different angles of incidence between two rays of greatest and smallest angles of incidence, respectively, and said dichroic coating having a tapered thickness varying approximately inversely with the cosine of the incident angles of said rays but deviating significantly therefrom to an amount which presents, to a selected one of said divergent rays striking the said coating at said greatest angle of incidence, an effective optical thickness to produce a reflected range having a peak at a certain wave length within said reflected band, and which presents to a second selected ray striking the said coating, at said smallest angle of incidence, an effective optical thickness to produce a reflected range having a peak at a certain wave length removed from said first wave length peak, such that the reflection characteristics for said selected rays, respectively, have an intersection point producing a steep cut off of said reflected ranges at the region of said intersection point; and means for limiting said reflected ranges to an effective band including said intersection point; whereby essentially uniform intensity for all rays within said effective band and a reflection-transmission characteristic with a steep cut off can be obtained.

2. Color selection device according to claim 1 wherein said range limiting means includes a color filter in the light emerging from said dichroic coating.

3. Color selection device according to claim 1 further comprising light sensitive material in the light emerging from said dichroic coating, said sensitive material being effectively insensitive to light outside of said effective band.

4. In a color selective optical device wherein rays of an imaging device follow divergent paths through said device; a planar transparent support oriented obliquely to said rays; on said support a first dichroic coating having several layers of dielectric material of alternatingly different indexes of refraction and capable of reflecting a first, short wave length color band and of transmitting the intermediate wave length colors of the visible spectrum due to interference effects, said rays striking said support at different angles of incidence between two rays of greatest and smallest angles of incidence, respectively, and said first dichroic coating having a tapered thickness varying at a ratio approximating, but significantly greater, than the inverse cosine of said angles of incidence, to an amount which presents, to a selected one of said divergent rays striking the said coating at said greatest angle of incidence, an effective optical thickness to produce a reflected range having a peak at a certain wave length within said first reflected band, and which presents, to a second selected ray striking the said coating at said smallest angle of incidence, an effective optical thickness to produce a reflected range having a peak at a certain wave length removed from said first wave length peak, such that the reflection characteristics for said selected rays, respectively, have on the greater wave length side of said first reflected band, a first intersection point producing a steep cut off of said reflected ranges at the region of said first intersection point; and on said support means, in series with said first dichroic coating, a second dichroic coating having several layers of dielectric material of alternatingly different indexes of refraction and capable of reflecting a second, long wave length color band and of transmitting the intermediate wave length colors of the visible spectrum due to interference effects, said second dichroic coating having a tapered thickness varying at a ratio approximating, but significantly smaller, than the inverse cosine of said angles of incidence, to an amount which presents, to said first selected divergent ray striking the said coating at said greatest angle of incidence, an effective optical thickness to produce a reflected range having a third peak at a certain wave length within said second reflected band, and which presents, to said second selected ray striking the said coating at said smallest angle of incidence, an effective optical thickness to produce a reflected range having a fourth peak at a certain wave length removed from said third wave length peak, such that the reflection characteristics for said selected rays, respectively, have on the shorter wave length side of said second reflected band a second intersection point producing a steep cut off of said reflected ranges of the second band at the region of said second intersection point; whereby essentially steep cut offs on either side of the intermediate color band and essentially uniform intensity for all rays in the regions of said cut offs can be obtained.

References Cited in the file of this patent

UNITED STATES PATENTS

| | | |
|---|---|---|
| 2,107,623 | Ball | Feb. 8, 1938 |
| 2,246,093 | Gillmore | June 17, 1941 |
| 2,412,496 | Dimmick | Dec. 10, 1946 |
| 2,418,627 | Dimmick | Apr. 8, 1947 |
| 2,589,930 | Dimmick et al. | Mar. 18, 1952 |
| 2,590,240 | Epstein | Mar. 25, 1952 |
| 2,604,813 | Gretener | July 29, 1952 |